April 20, 1943.  B. D. McINTYRE  2,317,291
LINER OR SPACER FOR LEAF SPRINGS
Filed April 21, 1941
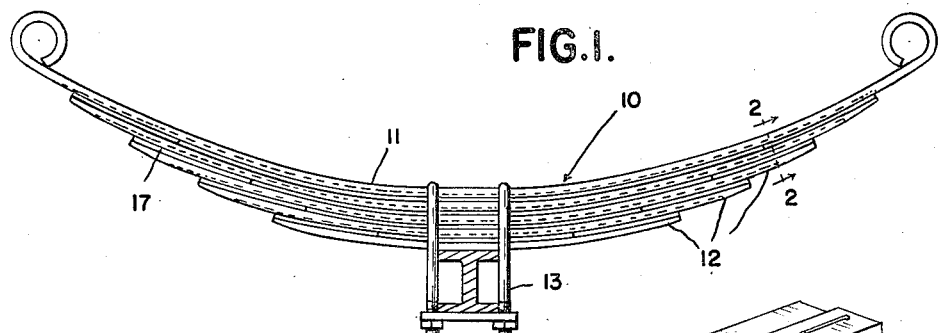
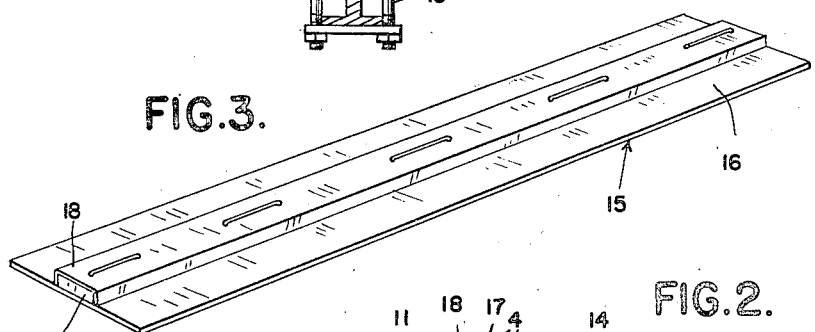
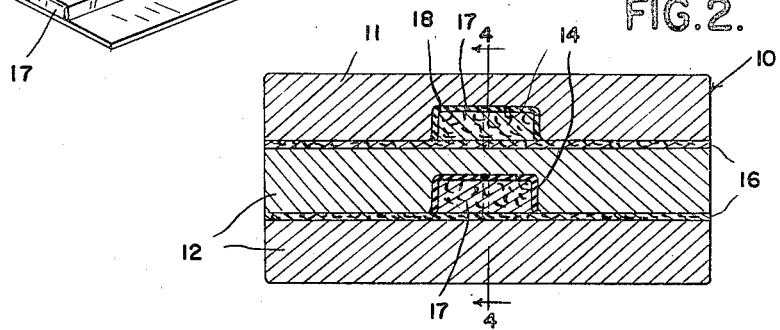
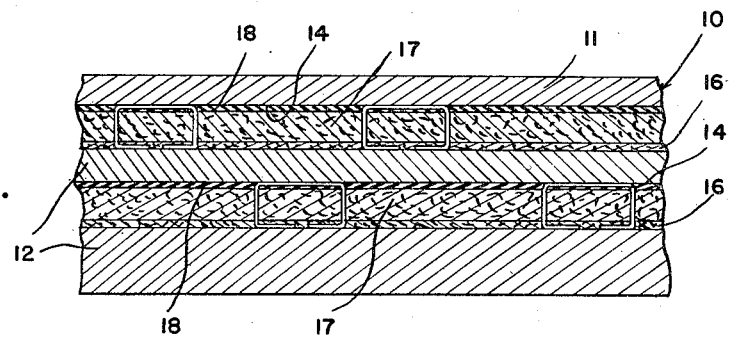
INVENTOR
BROUWER D. McINTYRE
BY
ATTORNEYS Patented Apr. 20, 1943

2,317,291

UNITED STATES PATENT OFFICE 2,317,291

LINER OR SPACER FOR LEAF SPRINGS

Brouwer D. McIntyre, Monroe, Mich., assignor to Monroe Auto Equipment Company, Monroe, Mich., a corporation of Michigan Application April 21, 1941, Serial No. 389,675

3 Claims. (Cl. 267—50)

This invention relates generally to leaf springs and refers more particularly to an improved liner or spacer for leaf springs.

It has been proposed to reduce the noise of operation of leaf springs and to control the coefficient of friction of the latter by inserting liners or spacers of nonmetallic material between adjacent leaves of the spring. Although in some instances the liners may extend for substantially the full length of the spring leaves, nevertheless, in the majority of practical applications the liners are limited to the end portions of the spring leaves and are provided with longitudinally extending ribs on one side engageable in suitable recesses formed in the adjacent sides of the spring leaves to prevent lateral displacement of the liners relative to the spring leaves.

While the above construction is satisfactory for preventing lateral displacement of the liners relative to the spring leaves, nevertheless, it does not anchor the liners against shifting movement longitudinally of the spring leaves during operation of the spring, and considerable difficulty has been encountered in accomplishing this result in a simple, inexpensive manner.

The present invention solves the above problem in a simple, inexpensive manner by coating the ribs with, or forming the same of a material which sets up sufficient friction between the adjacent surfaces of the ribs and spring leaves to anchor the liners against displacement longitudinally of the spring leaves.

Another object of this invention is to provide a liner having a relatively thin elongated body portion of fiber material interposed between adjacent spring leaves and having a longitudinally extending rib engageable in the groove formed in one spring leaf and coated with rubber or with some other substance capable of setting up sufficient friction between adjacent surfaces of the rib and groove to anchor the rib against shifting movement longitudinally of the groove.

The foregoing as well as other objects will be made more apparent as this description proceeds, especially when considered in connection with the accompanying drawing, wherein:

Figure 1 is a side elevational view of a leaf spring having a liner or spacer constructed in accordance with this invention;

Figure 2 is a cross sectional view taken substantially on the line 2—2 of Figure 1;

Figure 3 is a perspective view of one of the liners or spacers provided between adjacent spring leaves; and Figure 4 is a sectional view taken on the line 4—4 of Figure 2.

In Figure 1 of the drawing I have illustrated a semi-elliptical leaf spring 10 comprising a main leaf 11 and a plurality of secondary leaves 12 secured at the center to the main leaf by means of a suitable clamp 13. In accordance with conventional practice, the leaves of the spring 10 progressively decrease in length from the main leaf 11 to the lowermost leaf 12 and each leaf is fashioned with a longitudinally extending groove 14 in the bottom surface thereof. The grooves 14 are located midway between opposite longitudinal edges of the spring leaves and, in the interest of economy in manufacture, extend for substantially the full length of the spring leaves.

In order to provide the spring with a substantially constant coefficient of friction factor and at the same time reduce the tendency for squeaks to develop during the operation of the spring, I provide liners or spacers 15 between the spring leaves at the ends of the latter. Upon reference to Figures 2 and 3, it will be noted that each liner comprises an elongated strip of material 16 having a width approximating the width of the spring leaves and preferably formed of a fibrous material such as paper board stock impregnated with a suitable lubricant or wax. Stitched or otherwise secured to the upper surface of the strip of material 16 is a rib 17 formed of one or more laminations of a fabric material such as relatively inexpensive paper board. The rib 17 has a width approximating the width of the grooves 14 in the spring leaves and is adapted to fit in the grooves in the manner shown in Figure 2 to prevent lateral displacement of the liners relative to the spring leaves.

In actual practice, a liner of the above type is supported at each end of the secondary spring leaves 12 in positions to space the end portions of the spring leaves from each other. During operation of the spring there is a tendency for the liners to shift relative to the spring leaves in the direction of length thereof. In order to prevent longitudinal displacement of the liners and to hold the same in their proper positions with respect to the spring leaves, the rib 17 is formed of or is coated with a material having a greater coefficient of friction than the strip of material 16. In the present instance, the rib 17 is preferably formed of inexpensive paper board fibers and is coated with rubber or with some similar material 18 having practically the same friction characteristics as rubber. As stated above, the ribs 17 extend into the grooves 14 formed in the spring leaves and the base portions of the grooves are frictionally engaged by the adjacent surfaces of the ribs. Inasmuch as the ribs are coated with a rubber substance or with a material having similar friction characteristics, and in view of the clamping pressure applied to the ribs by the adjacent spring leaves, it follows that sufficient friction is set up to anchor the liners against shifting movement longitudinally of the spring leaves. It is important to note in this connection that while the ribs 17 cooperate with adjacent spring leaves to prevent displacement of the liners relative thereto, nevertheless, these ribs do not interfere with the action of the fiber strips 16 against adjacent spring leaves during operation of the spring.

What I claim as my invention is:

1. In a leaf spring having superimposed spring leaves, one of the spring leaves having a longitudinally extending groove, a liner comprising an elongated relatively flat strip of fibrous material interposed between adjacent spring leaves and having a longitudinally extending rib at one side thereof extending into said groove to prevent lateral shifting movement of the liner relative to the grooved spring leaf, and a coating of material on said rib having a greater coefficient of friction than the fibrous strip and engageable with the base of the groove to prevent shifting movement of the liner relative to the grooved spring leaf in the direction of length of the latter.

2. In a leaf spring having superimposed spring leaves, one of the spring leaves having a longitudinally extending groove, a liner comprising an elongated relatively flat strip of material interposed between adjacent spring leaves in engagement with the latter and having a longitudinally extending rib of relatively inexpensive material adapted to project into said groove, the surface of said rib adjacent the base of the groove being coated with a material having a greater coefficient of friction than the material from which the liner is formed and adapted to engage the base of said groove.

3. In a leaf spring having superimposed spring leaves, one of the spring leaves having a longitudinally extending groove in one surface thereof, a liner comprising an elongated relatively flat strip of fibrous material interposed between adjacent spring leaves in engagement with the latter and having a longitudinally extending rib at one side thereof adapted to project into said groove, and a coating of rubber material on the surface of the rib adjacent the base of the groove and frictionally engageable with the base of said groove.

BROUWER D. McINTYRE.